(12) United States Patent
Casaccia et al.

(10) Patent No.: US 8,755,357 B2
(45) Date of Patent: *Jun. 17, 2014

(54) METHOD AND APPARATUS FOR MANAGEMENT OF MULTI-CARRIER COMMUNICATIONS IN A WIRELESS COMMUNICATION SYSTEM

(75) Inventors: Lorenzo Casaccia, Rome (IT); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/104,652

(22) Filed: May 10, 2011

(65) Prior Publication Data

US 2011/0211533 A1 Sep. 1, 2011

Related U.S. Application Data

(63) Continuation of application No. 11/394,450, filed on Mar. 30, 2006, now Pat. No. 7,957,351.

(60) Provisional application No. 60/668,437, filed on Apr. 4, 2005.

(51) Int. Cl.
*H04W 4/00* (2009.01)
*H04W 52/42* (2009.01)

(52) U.S. Cl.
USPC .......... 370/334; 455/101; 455/269; 455/272; 455/279.1

(58) Field of Classification Search
CPC ...... H04B 7/0871; H04B 7/12; H04B 7/0868; H04B 7/068; H04B 7/081; H04B 7/0613
USPC .......... 455/269, 272, 273, 275, 276.1, 277.1, 455/277.2, 280, 552.1, 553.1, 120; 370/334
See application file for complete search history.

(56) References Cited

U.S. PATENT DOCUMENTS

| 4,783,779 A | 11/1988 | Takahata et al. |
| 6,208,855 B1 | 3/2001 | Tanaka |
| 6,256,290 B1 | 7/2001 | Ramesh |

(Continued)

FOREIGN PATENT DOCUMENTS

| CN | 1349325 A | 5/2002 |
| EP | 0929161 | 7/1999 |

(Continued)

OTHER PUBLICATIONS

European Search Report—EP10154104—International Search Authority—European Patent Office—May 20, 2010.

(Continued)

*Primary Examiner* — Allahyar Kasraian
(74) *Attorney, Agent, or Firm* — Eric Ho

(57) ABSTRACT

A method and apparatus manages resources in a wireless communication system by transmitting a multi-carrier switch command message to an access terminal instructing the access terminal to switch between a diversity mode where each antenna module of a plurality antenna modules receives a single carrier signal transmitted at a single carrier frequency and a multi-carrier mode where a first antenna module of the plurality antenna modules receives a first multi-carrier signal transmitted at a first carrier frequency and a second antenna module receives a second multi-carrier signals transmitted at a second carrier frequency.

17 Claims, 3 Drawing Sheets

(56) References Cited

U.S. PATENT DOCUMENTS

| | | |
|---|---|---|
| 6,266,360 B1 | 7/2001 | Okamoto |
| 6,522,896 B2 | 2/2003 | Chuberre et al. |
| 6,539,209 B1 | 3/2003 | Dajer et al. |
| 6,609,003 B1 | 8/2003 | Park et al. |
| 6,898,441 B1 | 5/2005 | Kogiantis et al. |
| 7,042,858 B1 | 5/2006 | Ma et al. |
| 7,142,824 B2 | 11/2006 | Kojima et al. |
| 7,142,828 B2 | 11/2006 | Dartois |
| 7,239,889 B2 | 7/2007 | Saari et al. |
| 7,340,236 B2 * | 3/2008 | Liang et al. ............... 455/277.2 |
| 7,397,864 B2 | 7/2008 | Tarokh et al. |
| 7,957,351 B2 | 6/2011 | Casaccia et al. |
| 2002/0071404 A1 * | 6/2002 | Park et al. ................ 370/331 |
| 2002/0080758 A1 | 6/2002 | Landais |
| 2003/0050032 A1 | 3/2003 | Masaki |
| 2003/0108087 A1 | 6/2003 | Shperling et al. |
| 2003/0152032 A1 | 8/2003 | Yanagihara et al. |
| 2003/0176176 A1 * | 9/2003 | Leinonen et al. ......... 455/277.1 |
| 2003/0235147 A1 | 12/2003 | Walton et al. |
| 2004/0009755 A1 | 1/2004 | Yoshida |
| 2004/0071222 A1 | 4/2004 | Liang et al. |
| 2004/0120302 A1 | 6/2004 | Sebire et al. |
| 2004/0152458 A1 | 8/2004 | Hottinen |
| 2004/0213351 A1 | 10/2004 | Shattil |
| 2004/0246923 A1 | 12/2004 | Achard |
| 2004/0248575 A1 | 12/2004 | Rajala et al. |
| 2005/0018713 A1 | 1/2005 | Ling et al. |
| 2005/0041622 A1 | 2/2005 | Dubuc et al. |
| 2005/0085195 A1 | 4/2005 | Tong et al. |
| 2005/0143024 A1 | 6/2005 | Sung et al. |
| 2005/0181797 A1 | 8/2005 | Piirainen |
| 2005/0202791 A1 * | 9/2005 | Krause ...................... 455/127.4 |
| 2005/0243780 A1 * | 11/2005 | Trainin et al. ................ 370/338 |
| 2006/0160553 A1 | 7/2006 | Piirainen |
| 2006/0178116 A1 | 8/2006 | Qi et al. |
| 2007/0189320 A1 | 8/2007 | Wu et al. |
| 2007/0286066 A1 | 12/2007 | Zhang et al. |
| 2007/0293165 A1 | 12/2007 | Leabman |

FOREIGN PATENT DOCUMENTS

| | | |
|---|---|---|
| EP | 1045531 | 10/2000 |
| JP | 1155738 A | 6/1989 |
| JP | 6290045 A | 10/1994 |
| JP | 2000036702 A | 2/2000 |
| JP | 2000069030 A | 3/2000 |
| JP | 2001298436 A | 10/2001 |
| JP | 2003338781 A | 11/2003 |
| JP | 2004104340 | 4/2004 |
| WO | WO9419877 A1 | 9/1994 |
| WO | WO0178254 A1 | 10/2001 |
| WO | WO0201749 | 1/2002 |
| WO | WO03065615 A1 | 8/2003 |

OTHER PUBLICATIONS

International Preliminary Report on Patentability—PCT/US06/012502—The International Bureau of WIPO, Geneva, Switzerland—Oct. 9, 2007.
International Search Report—PCT/US06/012502—International Search Authority, European Patent Office—Sep. 4, 2006.
Taiwanese Search Report—0951 12040—TIP0—Dec. 7, 2009.
Written Opinion—PCT/US06/012502—International Search Authority, European Patent Office—Sep. 4, 2006.
Taiwan Search Report—TW099109190—TIPO—Feb. 4, 2013.

* cited by examiner

METHOD AND APPARATUS FOR MANAGEMENT OF MULTI-CARRIER COMMUNICATIONS IN A WIRELESS COMMUNICATION SYSTEM

CLAIM OF PRIORITY UNDER 35 U.S.C. §119 AND §120

The present Application for Patent is a Continuation and claims priority to application Ser. No. 11/394,450, entitled "METHOD AND APPARATUS FOR MANAGEMENT OF MULTI-CARRIER COMMUNICATIONS IN A WIRELESS COMMUNICATION SYSTEM" filed Mar. 30, 2006, now U.S. Pat. No. 7,957,351, issued Jun. 7, 2011, and Provisional Application No. 60/668,437 entitled "METHOD AND APPARATUS FOR RECEIVER CONTROL IN A WIRELESS COMMUNICATION SYSTEM" filed Apr. 4, 2005, and assigned to the assignee hereof and hereby expressly incorporated by reference herein.

BACKGROUND

1. Field

The present invention relates generally to cellular communication systems, and more specifically, to a method and apparatus for managing multi-carrier communications.

2. Background

Global System for Mobile Communication (GSM) cellular communication systems provide communication services to mobile and portable devices through an arrangement of base stations. In GSM systems, frames of timeslots and radio blocks are transmitted and received at the mobile station using time division multiplexing. Although GSM systems originally provided voice communication services, GSM systems have evolved to provide data communication services as well. Standards such as general packet radio service (GPRS) and Enhanced Data for Global Evolution (EDGE) further define the protocols for data communication within GSM based systems. The access terminals, also sometimes referred to as mobile devices, portable devices and by other names, communicate over channels in the uplink and the downlink directions. In order to increase performance, some access terminals utilize receive diversity techniques where two or more antennas are used to receive signals transmitted on a single channel. Due to differences between the antennas such as, for example, antenna position, at least some of the incoming signals can be received at a higher quality. For example, due to multi-fading characteristics of the communication path, multiple signals may destructively combine at one antenna and constructively combine at another antenna. By using receive diversity, however, chances increase to receive a higher quality signal. In some receiver diversity cases the signals from multiple antennas are combined to increase the signal quality.

As GSM systems evolve to providing increased data and voice services, the need for bandwidth and system capacity increases. In a multi-carrier communication system, signals are transmitted using multiple channels at different carrier frequencies. The receiver simultaneously receives the multiple channels through multiple antennas resulting in an increased overall bandwidth. Conventional systems do not include a method for utilizing multiple antennas for diversity and multi-channel communications in a single access terminal.

Therefore, there is need for an apparatus and method for managing multi-carrier communication in a GSM communication system.

SUMMARY

One embodiment is a transmitter configured to transmit a message to an access terminal instructing the access terminal to switch between a diversity mode where each antenna module of a plurality antenna modules receives a single carrier signal transmitted at a single carrier frequency and a multi-carrier mode where a first antenna module of the plurality antenna modules receives a first multi-carrier signal transmitted at a first carrier frequency and a second antenna module receives a second multi-carrier signals transmitted at a second carrier frequency.

Another embodiment is a method for managing communications in a communication system, the method comprising transmitting a message to an access terminal instructing the access terminal to switch between a diversity mode where each antenna module of a plurality antenna modules receives a single carrier signal transmitted at a single carrier frequency and a multi-carrier mode where a first antenna module of the plurality antenna modules receives a first multi-carrier signal transmitted at a first carrier frequency and a second antenna module receives a second multi-carrier signals transmitted at a second carrier frequency.

Yet another embodiment is an access terminal in a wireless communication system, the access terminal configured to respond to a message, the message instructing the access terminal to switch between a diversity mode where each antenna module of a plurality antenna modules receives a single carrier signal transmitted at a single carrier frequency and a multi-carrier mode where a first antenna module of the plurality antenna modules receives a first multi-carrier signal transmitted at a first carrier frequency and a second antenna module receives a second multi-carrier signals transmitted at a second carrier frequency.

DETAILED DESCRIPTION

Figure 1:
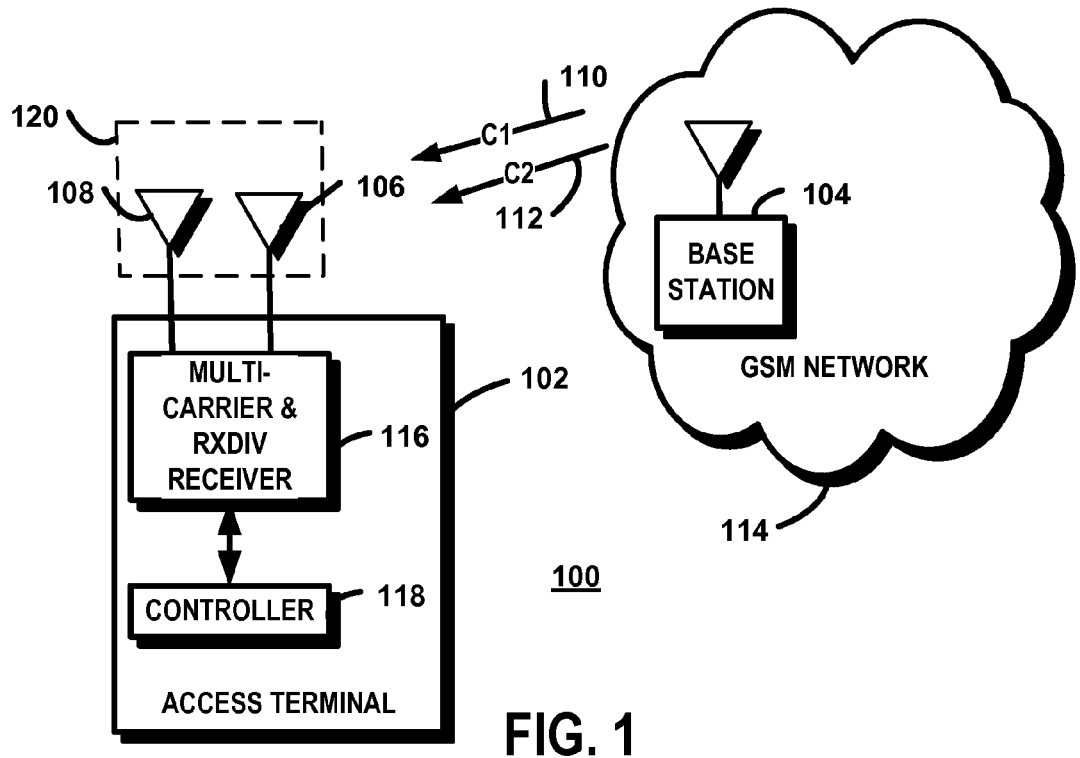
FIG. 1 is a block diagram of an access terminal communicating with a base station in accordance with the exemplary embodiment of the invention.

FIG. 1 is a block diagram of a GSM communication system 100 in accordance with the exemplary embodiment of the invention. The word "exemplary" is used herein to mean "serving as an example, instance, or illustration." Any embodiment described herein as "exemplary", therefore, is not necessarily to be construed as preferred or advantageous over other embodiments. The various functions and operations of the blocks described with reference to the GSM system 100 may be implemented in any number of devices, circuits, or elements. Two or more of the functional blocks may be integrated in a single device and the functions described as performed in any single device may be implemented over several devices in some circumstances. Although the GSM system 100 includes features, messages and other aspects currently undefined by GSM EDGE Radio Access Network (GERAN) standards, the GSM system 100 otherwise operates in accordance with GERAN communication techniques in the exemplary embodiment. Accordingly, the exemplary embodiment provides an example of changes to the current GERAN communication standard.

The GSM system 100 includes a GSM network 114 that provides communication services to a plurality of access terminals 102. An access terminal 102 may be any of several types of devices that facilitate any combination of voice and/or data communication with the GSM network 114. The access terminals 102, sometimes referred to as handsets, mobile stations (MS), wireless communication devices and other terms, include devices such as, for example, cellular phones and wireless personal digital assistants (PDAs). The GSM network 114 includes a plurality of base stations 104 that exchange wireless signals with the access terminals 102 as well as other infrastructure, databases, and backhaul. The GSM network 114 manages resources by controlling the communications of the access terminals using command and control messages in accordance with a communication protocol often defined by a standard protocol. Base stations 104 with the GSM network 114 include transmitters for transmitting voice, data and signaling messages to the access terminals 102. Receivers within the base stations 104 receive voice, data and signaling messages transmitted from the access terminals 102.

Signals transmitted by one or more base stations 104 in the GSM network 114 are received by a receiver 116 through an antenna system 120 where the antenna system 120 includes at least one antenna 106, 108. One or more access terminals 102 may include antenna systems 102 with multiple antennas 106, 108. An access terminal 102 with multiple antennas 106, 108 may utilize receive diversity techniques to improve receiver performance During receive diversity operation, multiple antennas 106, 108 are tuned to the same carrier frequency to receive multiple versions of a transmitted signal. Performance is improved where additional information is obtained from signals received through an additional antenna or from a combination of signals received from more than one antenna 106, 108. In some circumstances, the carrier frequency for the received signal may change over the course of a transmission. Such a situation occurs where frequency hopping is utilized, for example, in which case the carrier frequency a signal is transmitted upon changes on a per TDMA frame basis, following a pre-determined sequence. The multiple antennas 106, 108, therefore, remain tuned to the same signal and follow the "hopping" carrier frequency.

As mentioned above, multi-carrier communication provides a technique for increasing the peak data rate of downlink communication in an existing GERAN infrastructure. In a multi-carrier mode, at least two antennas 106, 108 receive different signals at different carrier frequencies. By using multiple carrier signals, more bandwidth is used for receiving information resulting in increased reception data rates at the access terminal 102.

The access terminal 102 in accordance with the exemplary embodiment is capable of operating in a receive diversity (RXDIV) mode and within a multi-carrier mode. The access terminal 102 includes an antenna system 120 that includes a plurality of antennas 106, 108. The antenna system 120 includes a first antenna 106 and a second antenna 108 in the exemplary embodiment. The multi-carrier and RXDIV receiver 202 includes appropriate hardware, software, and/or firmware for receiving multiple versions of a signal through at least two antennas 106, 108 in the RXDIV mode. Further, the receiver 202 is capable of receiving a first signal 110 at a first carrier frequency (C1) through one of the antennas 106 and a second signal 112 at a second carrier frequency (C2) through the other antenna 108.

The controller 118 is any combination of hardware, software and/or firmware configured to perform the functions described herein as well as facilitating the overall functionality of the access terminal. The controller 118 may include any number and combination of circuitry, electrical devices, memory and processing devices where the processing devices may include a single processor, microprocessor, processor arrangement, or logical gates. At least portions of the controller 118 may be implemented using discrete components, as part of integrated circuit, or as part of an application specific integrated circuit (ASIC). In the exemplary embodiment, software and firmware running on a processor perform the control functions described herein. Based on instructions received from the GSM network 114, the controller 116 generates control signals to configure the receiver 116. In addition to configuring hardware and invoking code, the controller 118 generates response, acknowledgement, and request messages in accordance with the protocol of the GSM system 100.

In the exemplary embodiment, the access terminal 102 remains in the receive diversity mode as a default configuration. In response to a multi-carrier switch command message received from the GSM network 114, the access terminal switches to the multi-carrier mode. The access terminal switches back to the receive diversity mode in response to a RXDIV switch command message received from the GSM network 114. When the multi-carrier switch command message is received, the access terminal 102 generates the appropriate control signals and configures the receiver 116 to receive a first signal 110 at a first carrier frequency through the first antenna 106 and to receive a second signal 112 at a second carrier frequency through the second antenna 108. In the exemplary embodiment, the receiver includes a receiver branch connected to each antenna 106, 108 allowing each receiver branch to be tuned to a different carrier frequency. An example of a suitable receiver branch includes one or more mixers for frequency shifting the incoming signal to the desired intermediate frequency or to baseband by mixing the incoming signal with an appropriate mixing signal. The frequency shifted signal is further processed and demodulated by other receiver 116 components. In some circumstances, each receiver branch may include filters in addition to common filters shared by multiple receiver branches. Each receiver branch is responsive to control signals to tune an indicated carrier frequency. During the receive diversity mode, the receiver branches are tuned to the same frequency allowing multiple versions of a single signal to be received. During the multi-carrier mode at least one of the receiver branches is tuned to different carrier frequency than one other receiver branch. Accordingly, the receiver 116 is capable of tuning multiple receiver branches to a single carrier frequency during the receive diversity mode and tuning the receiver branches to different carrier frequencies during the multi-carrier mode in response to the controller. Other techniques may be used in the receiver 116 in some circumstances to facilitate the multi-carrier and diversity capabilities. Although the description herein is limited to two antennas and two carriers, the discussion can be applied to any configuration including m diversity branches and n carriers where n<m.

Figure 2:
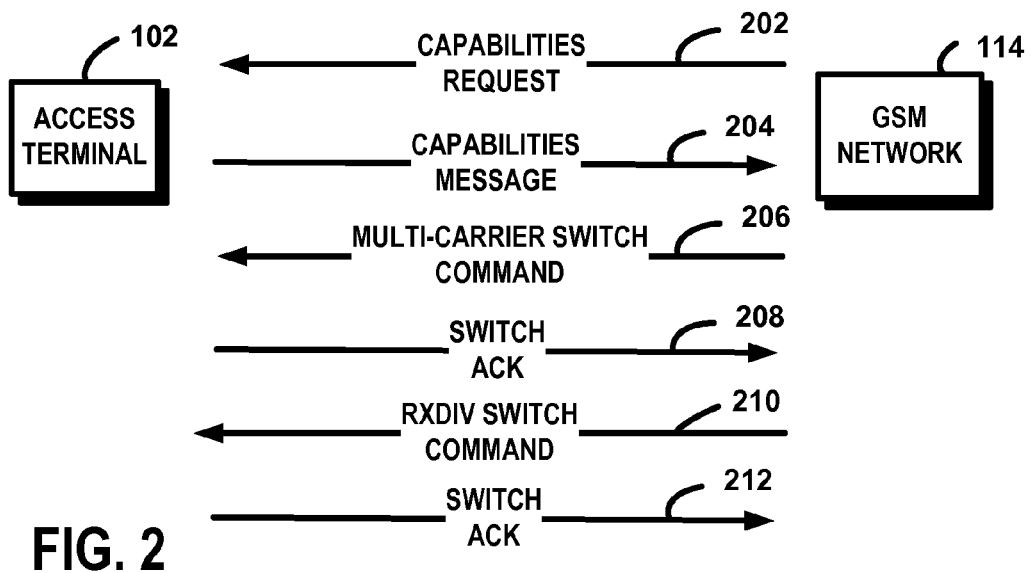
FIG. 2 is a block diagram of signaling messages exchanged between the GSM network and the access terminal in accordance with the exemplary embodiment.

FIG. 2 is a block diagram of signaling messages 202-212 exchanged between the GSM network 114 and the access terminal 102 in accordance with the exemplary embodiment. The signaling messages 202-212 may be incorporated into conventional signaling messages currently defined in GERAN specifications or may be implemented as additional messages to the GERAN specifications where portions of the messages 202-212 may be implemented over multiple conventional signaling messages and where two or more messages 202-212 may be implemented into single message.

In an exemplary embodiment, the GSM network 214 is informed by default of the multi-carrier and receive diversity capabilities of an access terminal 102. The GSM network 214 is informed of the multi-carrier and receive diversity capabilities of an access terminal 102 when the access terminal sends a capabilities message 204 indicating at least the receive diversity and multi-carrier capabilities of the access terminal. The capabilities message 204 is described in further detail below with reference to FIG. 3.

If the access terminal has RXDIV capabilities and multi-carrier capabilities, the GSM network manages resources by instructing the access terminal to switch between the RXDIV mode and the multi-carrier mode. The determination to switch may be based on any of several factors such as, for example, available bandwidth, the amount of data that will be received by the access terminal, the number of other nearby access terminals, data rates of other access terminals, the capabilities of other access terminals in the area, or any other reason depending on network algorithms.

The GSM network transmits a multi-carrier switch command 206 to instruct the access terminal to switch from the receive diversity mode to the multi-carrier mode. An example of a suitable multi-carrier switch command 206 includes a modification of a message in accordance with the GERAN specification such as Packet Downlink Assignment, Packet Timeslot Reconfigure, or similar messages After the access terminal successfully completes the switch from receiver diversity mode to the multi-carrier mode, the access terminal may transmit a switch acknowledgment message 208 indicating the switch was successful. An example of a suitable acknowledgment message 208 includes a message in accordance with the existing GERAN specification such as the Packet Downlink Acknowledgement message. In some circumstances, no acknowledgement is sent.

When the GSM network determines that the access terminal should be returned to receive diversity mode, the GSM network transmits a RXDIV switch command 210. An example of a suitable RXDIV switch command 206 includes a modification or an extension of a message in accordance with the existing GERAN specification such as Packet Downlink Assignment, Packet Timeslot Reconfigure, or similar messages The access terminal may transmit a switch acknowledgement message 212 indicating that the switch from the multi-carrier mode to the receive diversity mode was successful. In some circumstances, no acknowledgement is sent.

Figure 3:
FIG. 3 is a block diagram of a capabilities message in accordance with the exemplary embodiment.

FIG. 3 is block diagram of a capabilities message 204 in accordance with the exemplary embodiment. As explained above, the access terminal transmits the capabilities message 204 indicating the multi-carrier and receive diversity capabilities. The capabilities message 204 may include a RXDIV indicator 302 and a multi-carrier indicator 304. In the exemplary embodiment, the capabilities message 204 includes a one bit RXDIV indicator 203 and a one bit multi-carrier indicator 304 as well as other indicators 306 describing the other capabilities of the access terminal. Therefore, in the exemplary embodiment, a single bit indicates whether the access terminal has receive diversity capability and a single bit indicates whether the access terminal has multi-carrier capability. In some circumstances, the indicators may include multiple bits to convey additional information. An example of a suitable capabilities message 204 includes a message in accordance with the MS Radio Access Capabilities message where bits are received or added to the current format to convey the RXDIV and multi-carrier capabilities. In some circumstances, only a one bit multi-carrier indicator 304 is included in the capabilities message 204, with the assumption that all mobile terminals capable of multi-carrier are also implicitly capable of RXDIV.

Figure 4:
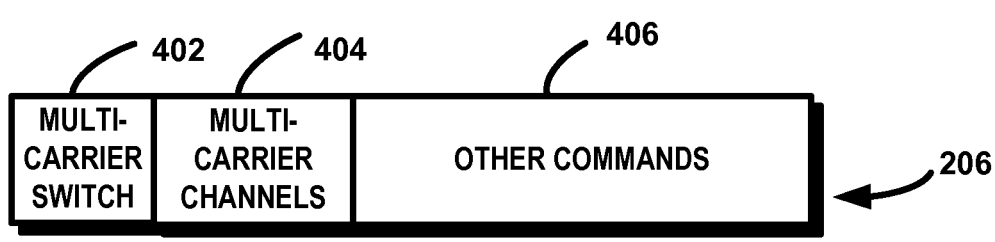
FIG. 4 is a block diagram of a multi-carrier switch command message in accordance with the exemplary embodiment.

FIG. 4 is a block diagram of a multi-carrier switch command message 206 in accordance with the exemplary embodiment. The multi-carrier switch command message 206 at least includes an instruction indicting that the access terminal should switch to the multi-carrier mode. In the exemplary embodiment, the multi-carrier switch command message 206 includes a multi-carrier switch indicator 402, a multi-carrier channel indicator 404 and other commands related to the timeslot configurations of the multiple carriers to which the terminal is assigned. An example of such a command includes a modification or extension of a message in accordance with the existing GERAN specification such as the Packet Downlink Assignment message or the Packet Timeslot Reconfigure message, or similar messages.

Figure 5:
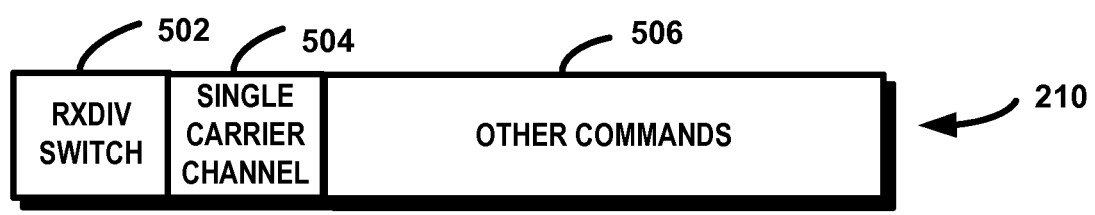
FIG. 5 is a block diagram of a RXDIV switch command message in accordance with the exemplary embodiment.

FIG. 5 is a block diagram of a RXDIV switch command message 210 in accordance with the exemplary embodiment. The RXDIV switch command message 210 at least includes an instruction indicting that the access terminal should switch to the receive diversity mode. In the exemplary embodiment, the RXDIV switch command message 210 includes a RXDIV switch indicator 502, a single carrier channel indicator 504 and other commands related to the timeslot configurations of the single carrier to which the terminal is assigned. An example of such command includes a modification or extension of a message in accordance with the existing GERAN specification such as the Packet Downlink Assignment message or the Packet Timeslot Reconfigure message, or similar messages. The single carrier channel indicator 504 indicates the single channel that will be used for transmitting signals to the access terminal.

Figure 6:
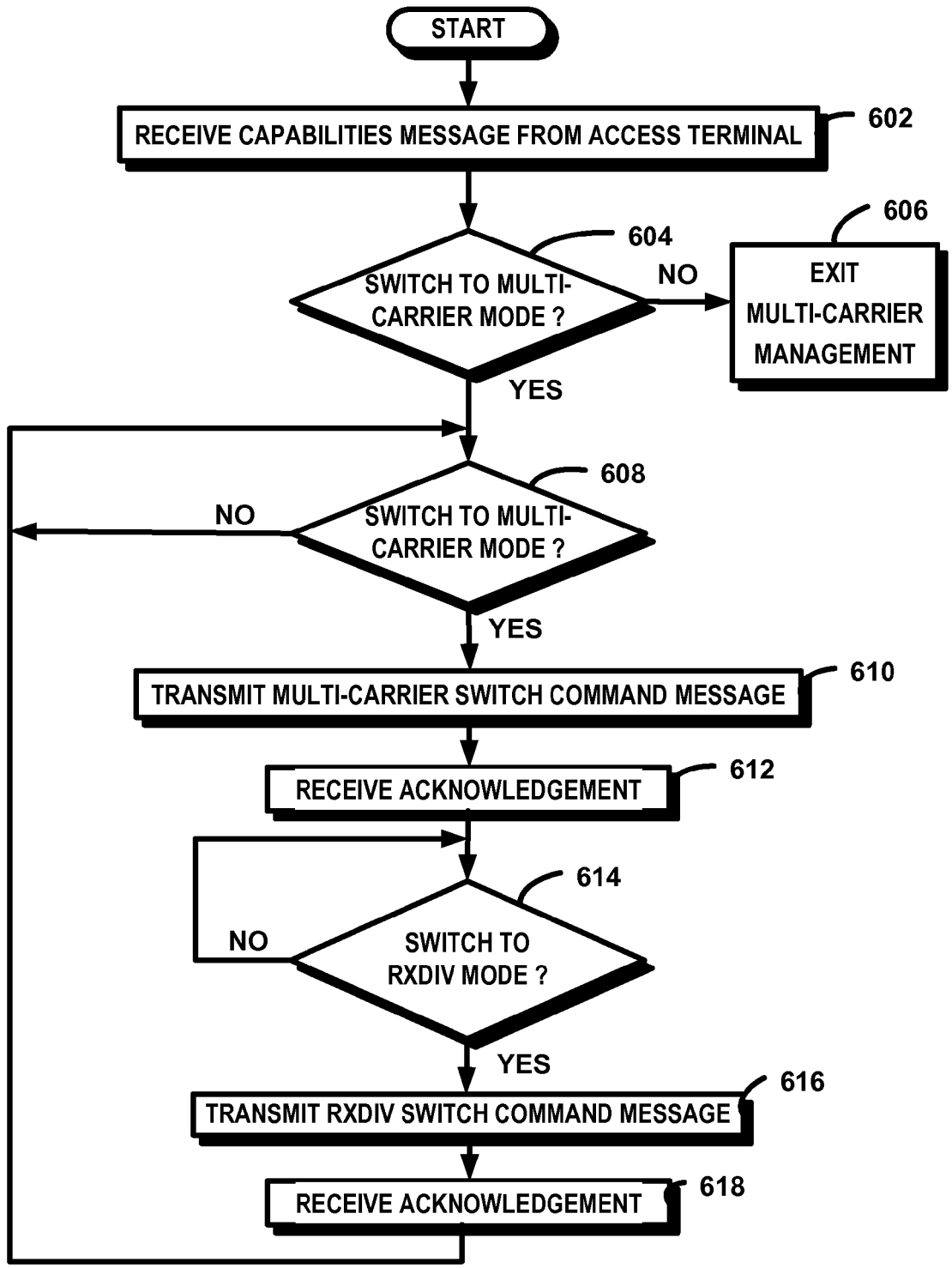
FIG. 6 is a flow chart of a method pf managing multi-carrier communication in a wireless communication system in accordance with the exemplary embodiment.

FIG. 6 is a flow chart of a method managing multi-carrier communications in a wireless communication system in accordance with the exemplary embodiment of the invention. The method may be performed using any combination of hardware, software and/or firmware. In the exemplary embodiment the method is performed in a base station or other network entity 104 within the GSM network 114. Although the method is discussed with reference to a single access terminal 102, the method is simultaneously performed for any number of access terminals 102 communicating within the GSM network 114.

At step 602, the base station 104 receives the capabilities message 204 indicating at least the receive diversity and multi-carrier capabilities of the access terminal 102.

At step 604, it is determined whether the access terminal 102 has multi-carrier capabilities. If the access terminal 102 does not have multi-carrier capabilities, the multi-carrier management for the particular access terminal 102 ends and the method proceeds to step 606. Otherwise, the method continues at step 608.

At step 608, it is determined whether the access terminal 102 should be switched to the multi-carrier mode. As discussed above, the access terminal 102 defaults to the receive diversity mode in the exemplary embodiment and therefore is only switched to multi-carrier mode as determined by the GSM network 114. The decision may be based on any number of factors and depends on the particular implementation of the GSM system and system capabilities. The determination to switch may be based on any of several factors such as, for example, available bandwidth, the amount of data that will be received by the access terminal 102, the number of other nearby access terminals (102), data rates of other access terminals (102), the capabilities of other access terminals (102) in the area, or any other reason depending on network algorithms. If it is determined that the access terminal 102 should remain in the receive diversity (RXDIV), the method returns the step 608 to continue monitoring system. If it is determined that the access terminal 102 should be switched to the multi-carrier mode, the method continues at step 610.

At step 610, the multi-carrier switch command message 206 is transmitted to the access terminal 102. In the exemplary embodiment, the multi-carrier switch command message 206 is transmitted by a transmitter in the base station 104.

At step 612, the switch acknowledgment 208 message is received from the access terminal. In the exemplary embodiment, the switch acknowledgment message 208 is received through a receiver in the base station 104. The base station 104 engages in a retransmission or resolution procedure if the acknowledgement message 208 is not received.

At step 614, it is determined whether the access terminal 102 should be switched to the single carrier receiver diversity mode. If the GSM network 114 determines the access terminal should be switched to RXDIV mode for efficient resource allocation or other reasons, the method continues at step 616. Otherwise, the method returns to step 614 to continue monitoring the system 100.

At step 616, the RXDIV switch command message 210 is transmitted to the access terminal. As discussed above, the RXDIV switch command message 210 includes a single carrier channel indicator 504 in the exemplary embodiment.

At step 618, a switch acknowledgement message 212 indicating that the switch from the multi-carrier mode to the receive diversity mode was successful is received. The base station 104 engages in a retransmission or resolution procedure if the acknowledgement message 208 is not received. The method then returns to step 608 to monitor the system to determine is the access terminal 102 should be switched to the multi-carrier mode. In some circumstances, acknowledgment messages may not be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal.

In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal comprising:
 a plurality of antennas; and
 a receiver including a plurality of receiver branches, wherein each receiver branch is connected to one corresponding antenna of the plurality of antennas,
 wherein the access terminal is operable in a receive diversity mode and is operable in a multi-carrier mode;
 wherein the access terminal is configured to:
  switch from the receive diversity mode to the multi-carrier mode upon receiving a multi-carrier switch command message from a remote transmitter after transmitting a capabilities message indicating the access terminal is capable of multi-carrier communication; and
  switch from the multi-carrier mode to the receive diversity mode in response to a receive diversity switch command message when the capabilities message indicates the access terminal is capable of receive diversity communication.

2. The access terminal of claim 1, wherein each receiver branch includes a mixer operable to frequency shift an incoming signal by mixing the incoming signal with a mixing signal to produce a frequency shifted signal.

3. The access terminal of claim 2, wherein the mixer is operable to frequency shift the incoming signal to one of a baseband and an intermediate frequency.

4. The access terminal of claim 2, wherein the receiver is operable to demodulate the frequency shifted signal to generate a demodulated frequency shifted signal.

5. The access terminal of claim 1, wherein each of the plurality of receiver branches includes a corresponding filter.

6. The access terminal of claim 1, further comprising a controller operable to generate a control signal associated with a carrier frequency, wherein each of the plurality of receiver branches is operable to be tuned to the carrier frequency in response to the control signal.

7. The access terminal of claim 1, wherein the capabilities message includes other access terminal capabilities.

8. A method comprising:
configuring an access terminal to operate in one of a receive diversity mode and a multi-carrier mode, wherein the access terminal includes a plurality of antennas and a plurality of receiver branches; and
tuning each of the plurality of receiver branches to a same carrier frequency when the access terminal is in the receive diversity mode;
wherein the access terminal is configured to:
switch from the receive diversity mode to the multi-carrier mode upon receiving a multi-carrier switch command message from a remote transmitter after transmitting a capabilities message indicating the access terminal is capable of multi-carrier communication; and
switch from the multi-carrier mode to the receive diversity mode in response to a receive diversity switch command message when the capabilities message indicates the access terminal is capable of receive diversity communication.

9. The method of claim 8, further comprising tuning a first receiver branch to a first carrier frequency and tuning a second receiver branch to a second carrier frequency when the access terminal is in the multi-carrier mode.

10. The method of claim 8, further comprising tuning a particular receiver branch to a particular carrier frequency in response to a control signal generated by a controller.

11. The method of claim 8, further comprising frequency shifting an incoming signal to produce a frequency shifted signal at an intermediate frequency, wherein a mixer included in a particular receiver branch frequency shifts the incoming signal by mixing the incoming signal with a mixing signal.

12. The method of claim 11, further comprising demodulating the frequency shifted signal.

13. The method of claim 8, further comprising frequency shifting an incoming signal to produce a frequency shifted signal at a baseband, wherein a mixer included in a particular receiver branch frequency shifts the incoming signal by mixing the incoming signal with a mixing signal.

14. The method of claim 13, further comprising demodulating the frequency shifted signal.

15. A non-transitory computer-readable medium storing processor-executable instructions that, when executed by a processor, cause the processor to:
configure an access terminal to operate in one of a receive diversity mode and a multi-carrier mode, wherein the access terminal includes a plurality of antennas and a plurality of receiver branches; and
tune each of the plurality of receiver branches to a same carrier frequency when the access terminal is in the receive diversity mode;
wherein the access terminal is configured to:
switch from the receive diversity mode to the multi-carrier mode upon receiving a multi-carrier switch command message from a remote transmitter after transmitting a capabilities message indicating the access terminal is capable of multi-carrier communication; and
switch from the multi-carrier mode to the receive diversity mode in response to a receive diversity switch command message when the capabilities message indicates the access terminal is capable of receive diversity communication.

16. The non-transitory computer-readable medium of claim 15, wherein the capabilities message includes other access terminal capabilities.

17. An apparatus comprising:
means for configuring an access terminal to operate in one of a receive diversity mode and a multi-carrier mode, wherein the access terminal includes a plurality of antennas and a plurality of receiver branches; and
means for tuning each of the plurality of receiver branches to a same carrier frequency when the access terminal is in the receive diversity mode;
wherein the access terminal is configured to:
switch from the receive diversity mode to the multi-carrier mode upon receiving a multi-carrier switch command message from a remote transmitter after transmitting a capabilities message indicating the access terminal is capable of multi-carrier communication; and
switch from the multi-carrier mode to the receive diversity mode in response to a receive diversity switch command message when the capabilities message indicates the access terminal is capable of receive diversity communication.

* * * * *